(12) United States Patent
Hoversten et al.

(10) Patent No.: US 11,150,377 B2
(45) Date of Patent: Oct. 19, 2021

(54) SYSTEM AND METHOD FOR OPTIMIZING HYDROCARBON PRODUCTION FROM SUBSURFACE RESERVOIRS

(71) Applicants: Chevron U.S.A. Inc., San Ramon, CA (US); The Regents of the University of California, Oakland, CA (US)

(72) Inventors: Gary Michael Hoversten, Lafayette, CA (US); Michael Commer, Emeryville, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 39 days.

(21) Appl. No.: 16/516,016

(22) Filed: Jul. 18, 2019

(65) Prior Publication Data
US 2021/0018647 A1   Jan. 21, 2021

(51) Int. Cl.
*G01V 3/38* (2006.01)
*E21B 49/00* (2006.01)
*G01V 3/30* (2006.01)
*E21B 41/00* (2006.01)

(52) U.S. Cl.
CPC .......... *G01V 3/38* (2013.01); *E21B 41/0092* (2013.01); *E21B 49/00* (2013.01); *G01V 3/30* (2013.01)

(58) Field of Classification Search
CPC ... G01V 3/38; G01V 3/30; G01V 3/00; E21B 41/0092; E21B 49/00
See application file for complete search history.

(56) References Cited

U.S. PATENT DOCUMENTS

| | | | |
|---|---|---|---|
| 7,054,749 B1* | 5/2006 | O'Meara, Jr. | G01V 1/50 702/13 |
| 9,938,818 B2* | 4/2018 | Hoversten | E21B 43/26 |
| 2009/0164188 A1* | 6/2009 | Habashy | E21B 49/00 703/10 |
| 2010/0185393 A1* | 7/2010 | Liang | G01N 15/088 702/7 |
| 2016/0266269 A1* | 9/2016 | Wilson | G01V 3/108 |
| 2018/0136356 A1* | 5/2018 | Wilson | E21B 47/113 |
| 2019/0196039 A1* | 6/2019 | Wilson | G01V 1/28 |

* cited by examiner

*Primary Examiner* — Mohamed Charioui
(74) *Attorney, Agent, or Firm* — Sheppard, Mullin, Richter & Hampton LLP

(57) ABSTRACT

A method is described for subsurface hydrocarbon reservoir characterization including receiving a time-lapse electromagnetic (EM) dataset and a flow dataset; inverting the time-lapse EM dataset using a parametric inversion that models steel well casings to determine a volume of fluid-changed reservoir; inverting the time-lapse EM dataset and the flow dataset using a joint inversion that honors the volume of the fluid-changed reservoir to determine relative permeability and capillary pressure; and characterizing flow characteristics in the volume of the fluid-changed reservoir. The method may be executed by a computer system.

19 Claims, 4 Drawing Sheets

SYSTEM AND METHOD FOR OPTIMIZING HYDROCARBON PRODUCTION FROM SUBSURFACE RESERVOIRS

REGARDING FEDERALLY SPONSORED RESEARCH OR DEVELOPMENT

This invention was made with government support under Contract No. DE-AC02-05CH11231 awarded by the U.S. Department of Energy. The government has certain rights in this invention.

TECHNICAL FIELD

The disclosed embodiments relate generally to techniques for optimizing hydrocarbon production from subsurface reservoirs and, in particular, to a method of estimating relative permeability and capillary pressure using flow and electromagnetic data.

BACKGROUND

Key parameters for determining how a hydrocarbon reservoir will perform under production and enhanced recovery techniques are the relative permeability of fluid and the capillary pressure as functions of fluid saturation. Currently only flow simulation modeling, whether by trial and error forward approaches or some form of automatic history matching, is used to try to estimate these functions at distances away from boreholes where core data is available.

There exists a need for improved estimation of relative permeability and capillary pressure in order to optimize production from subsurface hydrocarbon reservoirs.

SUMMARY

In accordance with some embodiments, a method of reservoir characterization is disclosed. The method may include receiving a time-lapse electromagnetic (EM) dataset and a flow dataset; inverting the time-lapse EM dataset using a parametric inversion that models steel well casings to determine a volume of fluid-changed reservoir; inverting the time-lapse EM dataset and the flow dataset using a joint inversion that honors the volume of the fluid-changed reservoir to determine relative permeability and capillary pressure; and characterizing flow characteristics in the volume of the fluid-changed reservoir.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of optimizing hydrocarbon production from subsurface reservoirs. These embodiments are designed to be of particular use for estimation of relative permeability and capillary pressure for a large portion of the reservoir based on just a few wells.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The present invention is a method to combine flow data (also called production data) and electromagnetic (EM) data in a joint inversion that allows the prediction of the relative permeability and capillary pressure functions at distances hundreds of meters away from boreholes. The addition of spatial information from the EM data means that flow data from only one or a few wells can be used to determine these key functions over a large portion of the reservoir.

Figure 1:
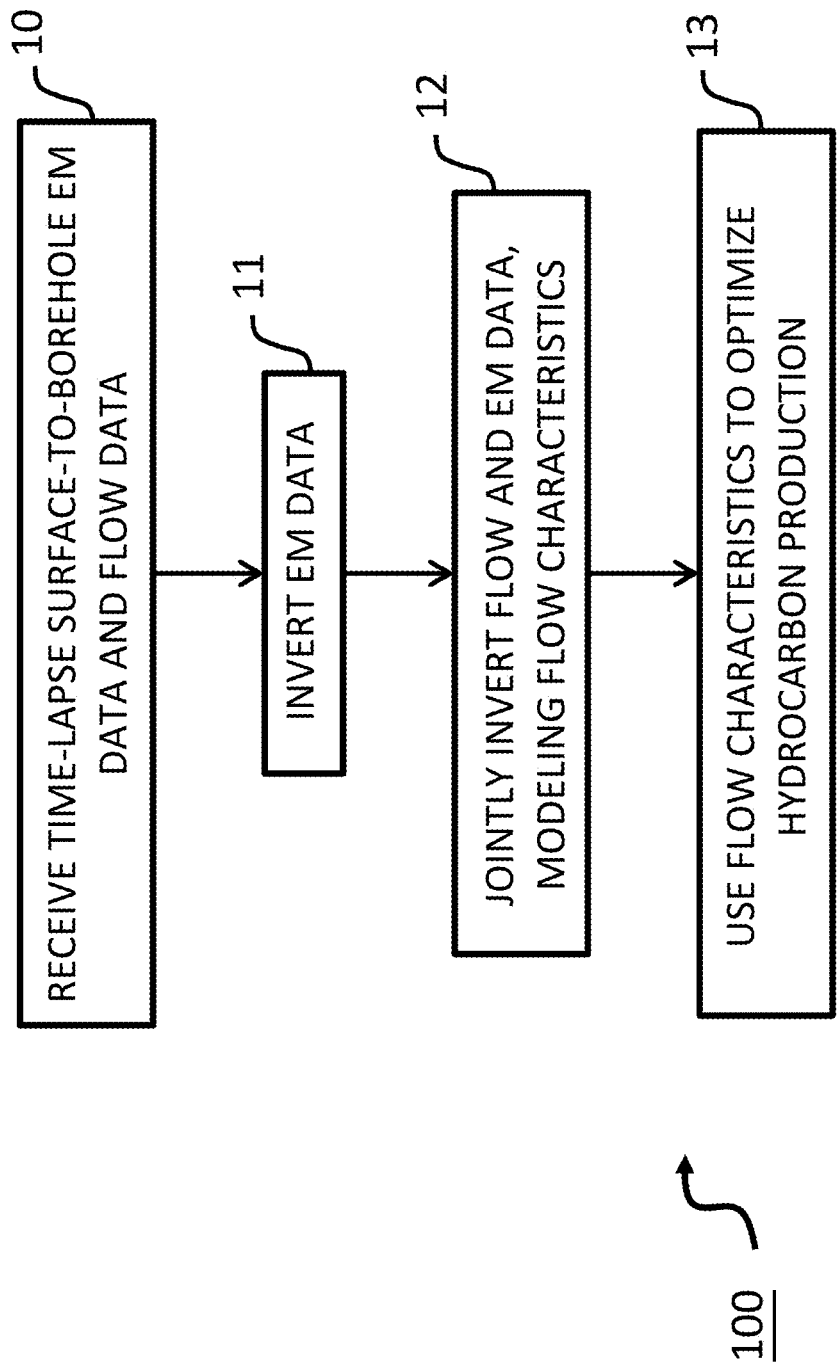
FIG. 1 illustrates a flowchart of a method of reservoir characterization, in accordance with some embodiments.

FIG. 1 illustrates a flowchart of a method 100 for reservoir characterization via estimation of relative permeability and capillary pressure in order to estimate flow characteristics of a subsurface hydrocarbon reservoir. At operation 10, a time-lapse surface-to-borehole electromagnetic dataset and flow data for at least one well is received. Flow data can be injection pressure, injection rate, production rate (bbl/day). This depends on if the well(s) are injectors or producers. The fluids that can be injected include water, $CO_2$, gas, and produced oil.

Figures 2A, 2B, 2C:
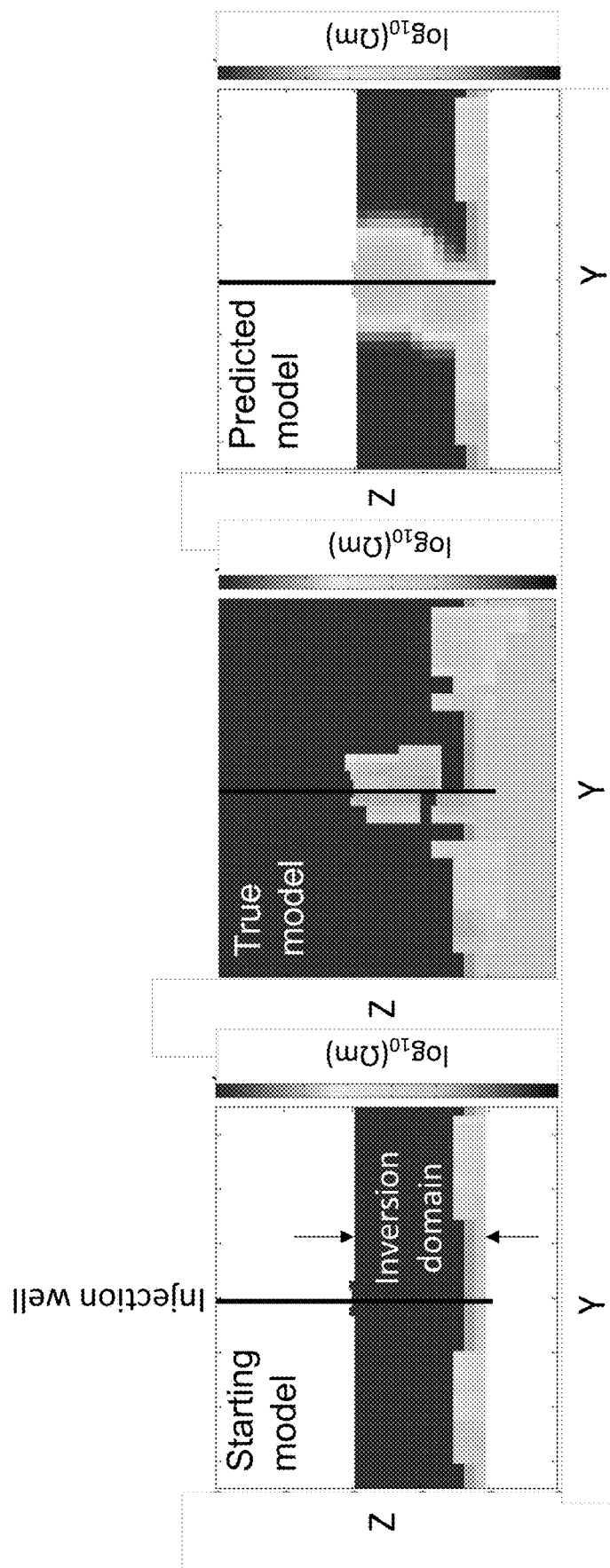
FIG. 2A demonstrates a step of a method of reservoir characterization, in accordance with some embodiments.
FIG. 2B shows the true model of the hydrocarbon reservoir.
FIG. 2C shows the result of a step of a method of reservoir characterization, in accordance with some embodiments.

At operation 11, the EM data is inverted using a parametric inversion that includes modeling the steel well casings. The numerical mesh is adjusted to be fine in the areas of the well casings. In an embodiment, finite element or OcTree finite difference meshes are optimal for representing casing without becoming too large for efficient computation. In the extreme case, the mesh is fine enough to represent the steel casings and its interior fluids (cell size is ½ or ⅓ of the casing thickness). Often the mesh cells that are used to represent the casing are larger than the casing thickness but still small compared to what is needed for the rest of the model. When the cells that contain the casings are larger than the casing electrical conductivity and magnetic susceptibility for the casing and interior fluids are upscaled into the large cells. The upscaling can be done in a number of ways that are known to those of skill in the art. The parametric inversion produces an estimate of the volume of reservoir that is changing due to production or injection of fluids. The parametric inversion is based on minimization of a misfit functional, in its general form $$\phi^{EM}(m) = \sum_{i=1}^{N} \left( \frac{d_i^{obs} - d_i^{pred}}{\varepsilon_i} \right),$$

where the vector m contains model parameters appropriate to describing reservoir geometry and volume. A parametric inversion procedure iteratively adjusts reservoir geometry parameters (m) (in one embodiment the geometry parameters are the dimensions and center location of 1 or more boxes where conductivity is allowed to change, if more than one box is used they can be constrained to touch and/or overlap each other to provide a contiguous region of anomalous conductivity) until N EM data observations ($d_i^{obs}$) are matched by their corresponding trial predictions ($d_i^{pred}$). Data noise is taken into account through measurement errors $\varepsilon_i$. This is demonstrated in FIGS. 2A-2C. FIG. 2A shows a starting model of a subsurface volume of interest. The inversion domain is the region identified in operation 11 as an estimate of the volume of reservoir that is changing due to production or injection of fluids. FIG. 2B shows the true model, i.e. the true answer. FIG. 2C is the result of operation 12, showing the predicted model. FIG. 2C matches the true model, particularly around the injection well.

Figure 3B:
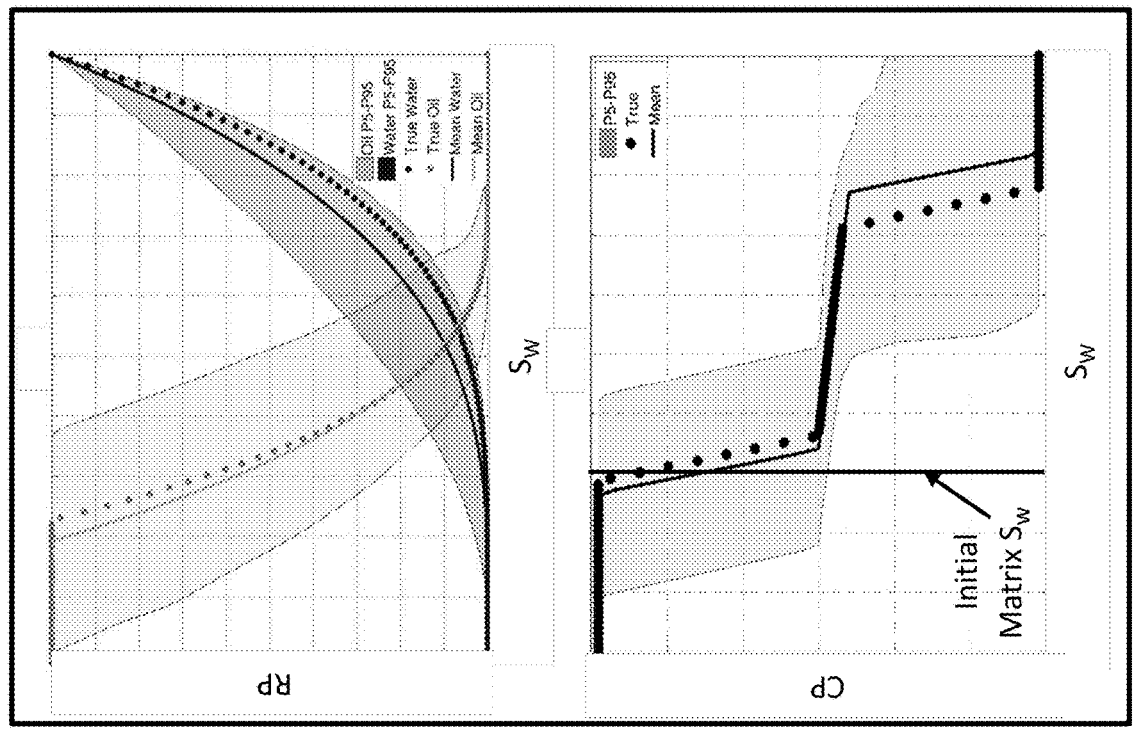
FIG. 3B demonstrates a result of a method of reservoir characterization, in accordance with some embodiments.
Figure 3A:
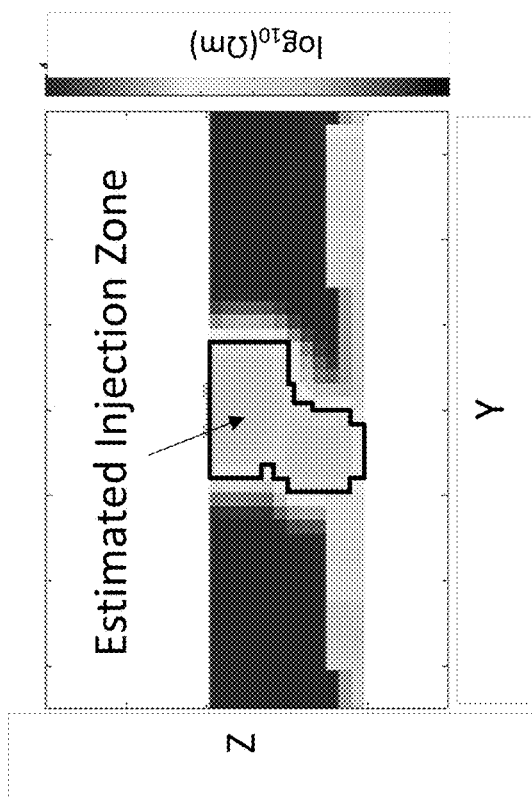
FIG. 3A shows the result of a step of a method of reservoir characterization, in accordance with some embodiments.

At operation 12, a joint flow and EM inversion is performed where the estimated volume that is changing is fixed based on the result of the inversion at operation 11. The joint inversion estimates hydraulic permeability and porosity within the reservoir volume, according to the minimization of a functional $\phi^{EM+Flow}(m)$ similar to operation 11, where m now describes permeability and porosity and the observations and predictions $d_i$ include both flow and EM data. Flow characteristics of the volume are modeled by a dual-permeability-porosity model using permeability and porosity estimates from operation 12 (such as the estimated injection zone shown in FIG. 3A). The operation contains functions representing the relative permeability of fluids and their capillary pressures. The relative-permeability's and capillary pressures are represented by parametric functions $RP_j$ (j=1, ..., $N^{RP}$) and $CP_k$ (k=1, ..., $N^{CP}$), respectively, so that their inverse modeling only has to estimate on the order of 10 to 15 parameters to accurately characterize the flow in a limited region. The inverse modeling involves a third functional to be minimized, $$\phi^{RP,CP}(m) = \sum_{i=1}^{N} \left( \frac{d_i^{obs} - d_i^{pred}(RP, CP)}{\varepsilon_i} \right),$$

where now the vector of data predictions $d^{pred}=d^{pred}(RP,CP)$ is a function of the $N^{RP}$ relative permeability and $N^{CP}$ capillary pressure parameters, the latter to be combined in the model parameter vector m. This operation will generate a 3-D model of the flow characteristics of part of the reservoir volume. Jointly inverting flow and EM data improves the RP and CP parameter estimation as shown in FIG. 3B.

At operation 13, the flow characteristics are used to optimize hydrocarbon production from the reservoir. For example, the 3-D model of the flow characteristics can be used to select new locations for production wells, locations for injection wells, depths for perforations in the well bores, types of enhanced hydrocarbon recovery, and the like. For example, types of enhanced hydrocarbon recovery may include water flood, steam flood, gas injection, polymer flooding, and the like.

Figure 4:
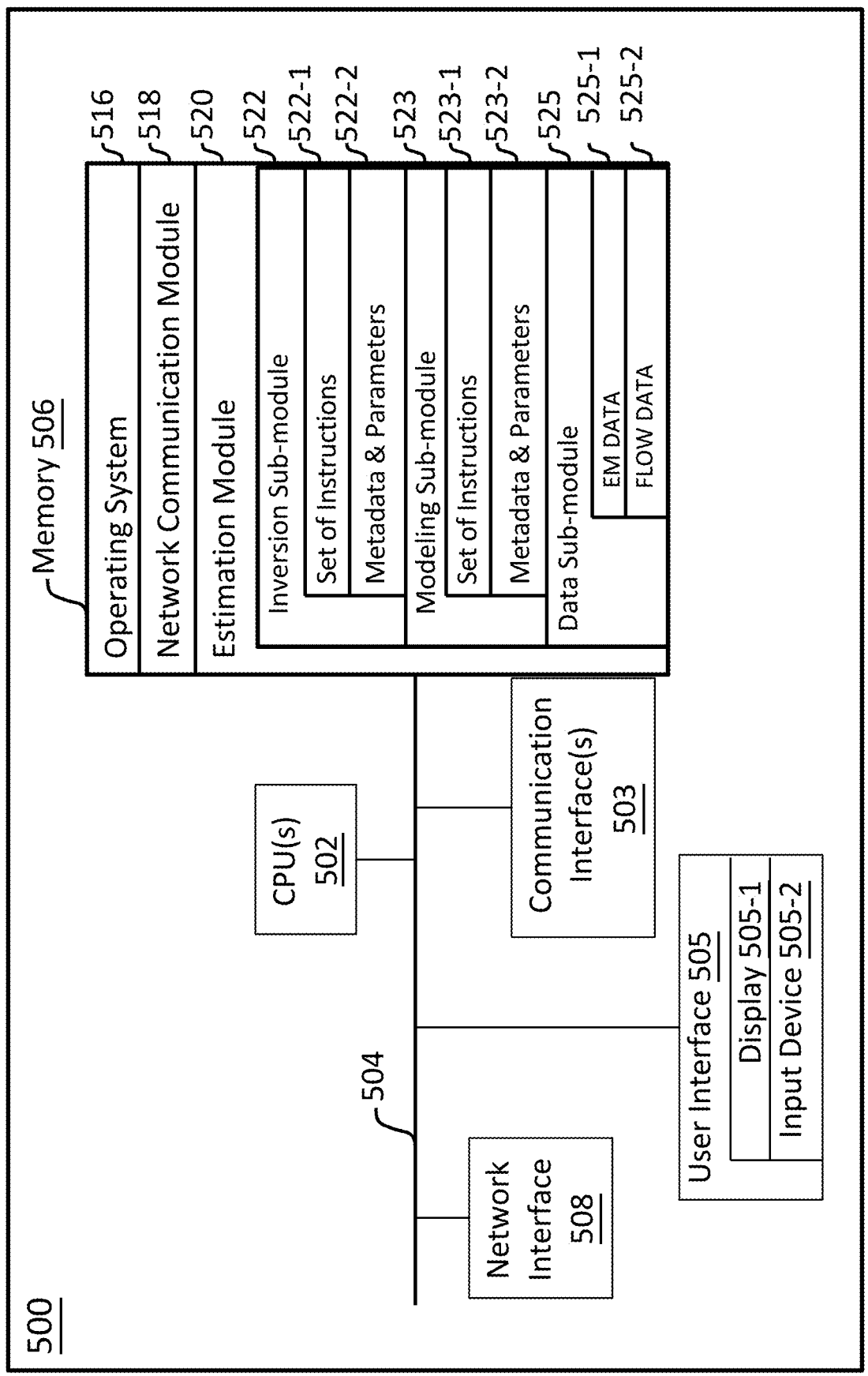
FIG. 4 is a block diagram illustrating a reservoir characterization system, in accordance with some embodiments.

FIG. 4 is a block diagram illustrating a reservoir characterization system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the reservoir characterization system 500 includes one or more processing units (CPUs) 502, one or more network interfaces 508 and/or other communications interfaces 503, memory 506, and one or more communication buses 504 for interconnecting these and various other components. The reservoir characterization system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store data, velocity models, images, and/or geologic structure information.

In some embodiments, memory 506 or the non-transitory computer readable storage medium of memory 506 stores the following programs, modules and data structures, or a subset thereof including an operating system 516, a network communication module 518, and an estimation module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the estimation module 520 executes the operations of method 100. Estimation module 520 may include data sub-module 525, which handles the data including EM data 525-1 and flow data 525-2. This data is supplied by data sub-module 525 to other sub-modules.

Inversion sub-module 522 contains a set of instructions 522-1 and accepts metadata and parameters 522-2 that will enable it to execute operations 11 and 12 of method 100. The modeling function sub-module 523 contains a set of instructions 523-1 and accepts metadata and parameters 523-2 that will enable it to execute at least operation 13 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing the EM and/or flow data and generate the flow characteristics. For example, any of the sub-modules may optionally be able to generate a display that would be sent to and shown on the user interface display 505-1. In addition, any of the data or processed data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 4) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of reservoir characterization, comprising:
   a. receiving, at a computer processor, a time-lapse electromagnetic (EM) dataset and a flow dataset;
   b. inverting, via the computer processor, the time-lapse EM dataset using a parametric inversion that models steel well casings to determine a volume of fluid-changed reservoir;
   c. inverting, via the computer processor, the time-lapse EM dataset and the flow dataset using a joint inversion using the volume of the fluid-changed reservoir to estimate permeability and porosity;
   d. generating, via the computer processor, relative permeability and capillary pressure based on the permeability and the porosity;
   e. characterizing, via the computer processor, flow characteristics in the volume of the fluid-changed reservoir using the relative permeability and the capillary pressure; and
   f. using the flow characteristics to select one or more of new locations for production wells, locations for injection wells, depths for perforations in the well bores, or type of enhanced hydrocarbon recovery method.

2. The method of claim 1 wherein the volume of the fluid-changed reservoir is affected by hydrocarbon production or injection of other fluids.

3. The method of claim 1 wherein the parametric inversion procedure iteratively adjusts reservoir geometry parameters until values in the time-lapse EM dataset are matched by their corresponding trial predictions and wherein data noise is taken into account.

4. The method of claim 1 wherein the joint inversion uses parametric functions representing the relative-permeability (RP) and the capillary pressure (CP) and minimizes $$\phi^{RP,CP}(m) = \sum_{i=1}^{N} \left( \frac{d_i^{obs} - d_i^{pred}(RP, CP)}{\varepsilon_i} \right).$$

wherein $\phi^{RP,CP}$ refers to the joint inversion, m refers to a model parameter vector, wherein $d_i^{obs}$ refers to EM data observations, wherein $d_i^{pred}(RP,CP)$ refers to a function of the $N^{RP}$ relative permeability parameters and $N^{CP}$ capillary pressure parameters, and wherein $\varepsilon_i$ refers to measurement errors.

5. The method of claim 1, further comprising generating a 3D model of the flow characteristics based on the flow characteristics.

6. The method of claim 1, wherein the flow dataset comprises one of injection pressure, injection rate, and production rate.

7. The method of claim 1 wherein a fluid in the fluid-changed reservoir comprises one of water, CO2, gas, and produced oil.

8. A computer system, comprising:
one or more processors;
memory; and
one or more programs, wherein the one or more programs are stored in the memory and configured to be executed by the one or more processors, the one or more programs including instructions that when executed by the one or more processors cause the system to:
 a. receive, at the one or more processors, a time-lapse electromagnetic (EM) dataset and a flow dataset;
 b. invert the time-lapse EM dataset using a parametric inversion that models steel well casings to determine a volume of fluid-changed reservoir;
 c. invert the time-lapse EM dataset and the flow dataset using a joint inversion using the volume of the fluid-changed reservoir to estimate permeability and porosity;
 d. generate relative permeability and capillary pressure based on the permeability and the porosity; and
 e. characterize flow characteristics in the volume of the fluid-changed reservoir using the relative permeability and the capillary pressure; and
 f. use the flow characteristics to select one or more of new locations for production wells, locations for injection wells, depths for perforations in the well bores, or type of enhanced hydrocarbon recovery method.

9. The system of claim 8, wherein the volume of the fluid-changed reservoir is affected by hydrocarbon production or injection of other fluids.

10. The system of claim 8, wherein the parametric inversion procedure iteratively adjusts reservoir geometry parameters until values in the time-lapse EM dataset are matched by their corresponding trial predictions and wherein data noise is taken into account.

11. The system of claim 8, wherein the joint inversion uses parametric functions representing the relative-permeability (RP) and the capillary pressure (CP) and minimizes $$\phi^{RP,CP}(m) = \sum_{i=1}^{N}\left(\frac{d_i^{obs} - d_i^{pred}(RP, CP)}{\varepsilon_i}\right),$$

wherein $\phi^{RP,CP}$ refers to the joint inversion, m refers to a model parameter vector, wherein $d_i^{obs}$ refers to EM data observations, wherein $-d_i^{pred}(RP,CP)$ refers to a function of the $N^{RP}$ relative permeability parameters and $N^{CP}$ capillary pressure parameters, and wherein $\varepsilon_i$ refers to measurement errors.

12. The system of claim 8, wherein the flow dataset comprises one of injection pressure, injection rate, and production rate.

13. The system of claim 8, wherein a fluid in the fluid-changed reservoir comprises one of water, CO2, gas, and produced oil.

14. A non-transitory computer readable storage medium storing one or more programs, the one or more programs comprising instructions, which when executed by an electronic device with one or more processors and memory, cause the device to:
 a. receive, at the one or more processors, a time-lapse electromagnetic (EM) dataset and a flow dataset;
 b. invert the time-lapse EM dataset using a parametric inversion that models steel well casings to determine a volume of fluid-changed reservoir;
 c. invert the time-lapse EM dataset and the flow dataset using a joint inversion that uses the volume of the fluid-changed reservoir to estimate permeability and porosity;
 d. generate relative permeability and capillary pressure based on the permeability and the porosity;
 e. characterize flow characteristics in the volume of the fluid-changed reservoir using the relative permeability and the capillary pressure; and
 f. use the flow characteristics to select one or more of new locations for production wells, locations for injection wells, depths for perforations in the well bores, or type of enhanced hydrocarbon recovery method.

15. The non-transitory computer readable storage medium of claim 14, wherein the volume of the fluid-changed reservoir is affected by hydrocarbon production or injection of other fluids.

16. The non-transitory computer readable storage medium of claim 14, wherein the parametric inversion procedure iteratively adjusts reservoir geometry parameters until values in the time-lapse EM dataset are matched by their corresponding trial predictions and wherein data noise is taken into account.

17. The non-transitory computer readable storage medium of claim 14, wherein the joint inversion uses parametric functions representing the relative-permeability (RP) and the capillary pressure (CP) and minimizes $$\phi^{RP,CP}(m) = \sum_{i=1}^{N}\left(\frac{d_i^{obs} - d_i^{pred}(RP, CP)}{\varepsilon_i}\right),$$

wherein $\phi^{RP,CP}$ refers to the joint inversion, m refers to a model parameter vector, wherein $d_i^{obs}$ refers to EM data observations, wherein $-d_i^{pred}(RP,CP)$ refers to a function of the $N^{RP}$ relative permeability parameters and $N^{CP}$ capillary pressure parameters, and wherein $\varepsilon_i$ refers to measurement errors.

18. The non-transitory computer readable storage medium of claim 14, wherein the flow dataset comprises one of injection pressure, injection rate, and production rate.

19. The non-transitory computer readable storage medium of claim 14, wherein a fluid in the fluid-changed reservoir comprises one of water, CO2, gas, and produced oil.

* * * * *